United States Patent Office 3,769,270
Patented Oct. 30, 1973

3,769,270
METHOD OF POLYMERIZING BUTADIENE WITH THE AID OF A THREE COMPONENT CATALYST COMPRISING A MIXTURE OF (1) A GROUP II OR III METAL HYDRIDE OR DERIVATIVES THEREOF, (2) AN ORGANONICKEL OR COBALT COMPOUND AND (3) A FLUORINE CONTAINING MATERIAL
William M. Saltman and Morford C. Throckmorton, Akron, Ohio, assignors to The Goodyear Tire & Rubber Company, Akron, Ohio
No Drawing. Continuation of abandoned application Ser. No. 702,165, Feb. 1, 1968. This application Dec. 10, 1969, Ser. No. 880,495
Int. Cl. C08d 3/06
U.S. Cl. 260—94.3                4 Claims

ABSTRACT OF THE DISCLOSURE

A method and a catalyst system for the solution polymerization of butadiene or butadiene in mixture with other diolefins to form polymers containing a high content of cis-1,4 addition is described. The solution polymerization is carried out under conventional polymerization conditions. The catalyst employed is a mixture of (1) at least one compound selected from the group consisting of hydrides of metals of Groups II and III of the Periodic Table and their monomeric or polymeric halide derivatives, amine derivatives and complexes of these hydrides with amines, ethers or other molecules capable of forming complex compounds with these hydrides, (2) at least one compound selected from the class consisting of organonickel and organocobalt compounds and (3) at least one fluorine containing compound selected from the group consisting of boron trifluoride, boron trifluoride addition complexes, metal fluorides, hydrogen fluoride and trialkyltin fluorides.

---

This application is a continuation of Ser. No. 702,165, filed Feb. 1, 1968, now abandoned.

This invention is directed to methods of polymerizing butadiene and butadiene in mixture with other diolefins to form polymers having a high content of cis-1,4 addition. It is also directed to catalyst systems useful for this purpose.

Polymers of butadiene, or butadiene in mixture with other diolefins, containing a high proportion of the butadiene units in the cis-1,4 configuration possess properties which make them useful as synthetic rubbers.

It is an object of this invention to provide a method whereby butadiene can be polymerized to a high content of cis-1,4 polybutadiene. Another object is to provide a catalyst system, by means of which these polymerizations may be accomplished. Another object is to provide a catalyst system to be used to polymerize butadiene in the absence of any Group I, II and III compounds containing direct bonds of carbon to the metals of Groups I, II or III. Another object is to produce high cis-1,4 polybutadiene with excellent processing properties. Other objects will become apparent as the description proceeds.

Polybutadiene with good processing properties as manifested during actual factory processing, has been produced by a ternary catalyst system comprising (1) triethylaluminum, (2) an organonickel salt, and (3) boron trifluoride diethyl ether complex. Polybutadiene produced by the above catalyst system possesses a very high cis-1,4 molecular structure and shows an appreciable improvement in processability properties over polybutadiene prepared by earlier processes using alkyllithium as a single catalyst system and earlier processes employing alkylaluminum titanium tetraiodide, a binary catalyst system.

Unlike the ternary system described above, the catalyst system of the present invention is carried out in the absence of any Group I, II or III metal compound containing direct metal to carbon bonds, particularly a carbon-aluminum bond. The processability of the polymer produced by the system of the present invention is as good as that produced by the system using aluminum trialkyl, an organonickel salt and boron trifluoride diethyl ether complex and better than that produced by other catalyst systems in current industrial use.

Thus according to the present invention, butadiene or butadiene in combination with other diolefins is polymerized by contact, under solution polymerization conditions, with a catalyst comprising (A) at least one compound selected from the group consisting of hydrides of metals of Groups II and III of the Periodic Table and their monomeric or polymeric halide derivatives, amine derivatives and complexes of these hydrides with amines, ethers or other molecules capable of forming complex compounds with these hydrides, (B) at least one compound selected from the class consisting of organonickel and organocobalt compounds and (C) at least one fluorine containing compound selected from the group consisting of boron trifluoride, boron trifluoride addition complexes, hydrogen fluoride, metal fluorides and alkyltin fluorides.

The compounds answering the description of the first or (A) catalyst component may all be described as derivatives of the hydrides of metals of Groups II and III of the Periodic Table. When aluminum hydride (AlH$_3$) is the hydride referred to, the compounds are often referred to as alanes or substituted alanes. In analogy with this type of nomenclature, the boron hydride derivatives are often referred as boranes; gallium hydride derivatives as gallanes; magnesium hydride derivatives as magnanes etc. Thus, a compound such as H$_2$AlCl·N(CH$_3$)$_3$ is known as trimethylamine chloroalane. It may, of course, be called trimethylamine chloroaluminum hydride and both names are equally descriptive and valid. Since AlH$_3$ is known to actually be a polymeric species and many of its derivatives may be polymeric also, the definition above is intended to include polymeric species as well. Polymeric species of such metal hydrides may be readily formed when one of the substituents on the aluminum is polyvalent.

The compounds corresponding to the first or (A) catalyst component of the present invention can be represented by the three formulae as follows:

Formula 1

wherein Me represents a metal of Groups II or III of the Periodic System; H is hydrogen; X is selected from hydrogen or halogen and Z is selected from hydrogen, halogen, oxygen or nitrogen; R represents an alkyl, aryl, alkylaryl, arylalkyl or cycloalkyl radicals; $a$, $b$ and $c$ are integers; $a$ is one unit less than the absolute value of the valence of Z and may be 0, 1 or 2; $b$ is 0 or 1 as is $c$, while the sum of $b$ plus $c$ is one unit less than the valence of Me. It is understood, of course, that when $b$ is zero there is no Me to R bond.

Formula 2

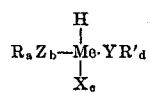

which represents complexes of the compounds of Formula 1. In Formula 2, Y represents oxygen or nitrogen; R' represents hydrogen or an alkyl, aryl, alkylaryl, arylalkyl or cycloalkyl radical; and $d$ is an integer equal to the valence of Y. Where there is more than one R' group they need not be the same. The remainder of the symbols are as in Formula 1.

Formula 3

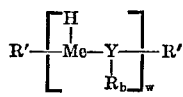

where the compound is polymeric in nature; $w$ represents the number of monomer units in the polymer and all the other symbols are the same as in Formula 2 above. Please note that Me in Formula 3 must represent only a Group III metal and not a Group II metal.

The metals from Group II or III of the Periodic System are preferably chosen from aluminum, magnesium, zinc or cadmium. Of these, aluminum is the most preferred.

The first catalyst component as illustrated by symbolic Formula 1 above can be represented by the following chemical compounds. The compounds listed below are based on aluminum as the representative metal selected from either Group II or Group III and are properly called alane compounds. The representative compounds, although not exhaustive of their class are as follows:

dimethylamino aluminum hydride
$(CH_3)_2NAlH$
diisobutylamino aluminum hydride
$(iC_3H_7)_2NAlH_2$
diphenylamino aluminum hydride
$(C_6H_5)_2NAlH_2$
dimethylamino bromoaluminum hydride
$(CH_3)_2NAlHBr$
diethylamino chloroaluminum hydride
$(C_2H_5)_2NAlHCl$
methylethylamino iodoaluminum hydride
$(CH_3)(C_2H_5)NAlHI$ The first catalyst component as illustrated by Formula 2 are organic addition complexes formed by a central metal hydride of Groups II and III metals complexed with various organic ligands. Representatives of such compounds include:

| | |
|---|---|
| Trimethylamine alane | $AlH_3 \cdot N(CH_3)_3$ |
| Triethylamine chloroalane or triethylamine chloroaluminum hydride complex | $AlH_2Cl \cdot N(C_2H_5)_3$ |
| Trimethylamine chloroalane | $AlH_2Cl \cdot N(CH_3)_3$ |
| Trimethylamine dichloroalane | $AlHCl_2 \cdot N(CH_3)_3$ |
| Trimethylamine chlorozinc hydride complex or trimethylamine chlorzincane | $ZnHCl \cdot N(CH_3)_3$ |
| Diethyl ether alane | $AlH_3 \cdot O(C_2H_5)_2$ |
| Diethyl ether dichloroalane | $AlHCl_2 \cdot O(C_2H_5)_2$ |
| Diethyl ether diiodoalane | $AlHI_2 \cdot O(C_2H_5)_2$ | and the like.

Examples of organic molecule types capable of forming addition complexes of ligand groups with metals of Groups II or III of the Periodic System include ethers, cyclic ethers, tetrahydrofuran, tertiary amines and the like.

Also, polymers of the above aluminum amino hydrides can be formed. A representative example which is by no means exclusive of all the polymers which can be formed is poly-(n-butyliminoalane) represented by the structural formula:

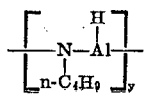

where the structure represents the basic monomer unit and $y$ represents the number of units in the polymer. For optimum service as a catalyst component the polymeric alane derivatives should be within a molecular weight range which will permit the polymer to be readily dissolved in a suitable organic solvent. More will be said below of the solvents suitable for use in solution polymerization.

The second or (B) component of the catalyst system of this invention is an organometallic compound which contains nickel and/or cobalt. The compound may be any organonickel compound or any organocobalt compound. It is preferred to employ soluble compounds of nickel and/or cobalt. These soluble compounds of nickel and/or cobalt are usually compounds of the said metals with a mono- or bi-dentate organic ligand containing up to 20 carbon atoms. "Ligand" is defined as an ion or molecule bound to and considered bonded to a metal atom or ion. Monodentate means having one position through which covalent or coordinate bonds with the metal may be formed; bi-dentate means having two positions through which covalent or coordinate bonds with the metal may be formed. By the term "soluble" is meant soluble in inert solvents. Thus, any nickel salt and/or cobalt salt of an organic acid, containing from about 1 to 20 carbon atoms may be employed.

Representative of such organonickel compounds are nickel benzoate, nickel acetate, nickel naphthenate, bis-(alpha furyl dioxime)nickel, nickel octanoate, nickel palmitate, nickel stearate, nickel acetylacetonate, bis(salicylaldeyde)ethylene diimine nickel and nickel salicylaldehyde. Nickel tetracarbonyl also may be employed as the nickel containing catalyst in this invention. The preferred component containing nickel is a nickel salt of a carboxylic acid or an organic complex compound of nickel.

Representative of such organocobalt compound are cobalt benzoate, cobalt acetate, cobalt naphthenate, ois-(alpha furyl dioxime)cobalt, cobalt octanoate, cobalt palmitate, cobalt stearate, cobalt acetylacetonate, bis(salicylaldehyde ethylene diimine)cobalt and cobalt salicylaldehyde. Dicobalt octacarbonyl also may be employed as the cobalt containing catalyst in this invention. The preferred component containing cobalt is a cobalt salt of a carboxylic acid or an organic complex compound of cobalt.

The third or (c) component of the catalyst system is a fluorine-containing compound selected from the group consisting of boron trifluoride, boron trifluoride addition complexes, hydrogen fluoride, active metal fluorides and alkyltin fluorides. The first group of fluorine-containing compounds considered are the active metal fluorides. Representative of such metal fluorides are tungsten hexafluoride, molybdenum hexafluoride, phosphorous pentafluoride, tin tetrafluoride, titanium tetrafluoride, titanium trifluoride, zirconium tetrafluoride, zinc difluoride, antimony trifluoride, antimony pentafluoride, iron trifluoride, cobalt trifluoride, vanadium trifluoride and various other active metal fluorides.

The second group of fluorine containing compounds considered are boron trifluoride gas and its complexes with at least one member of the class of electron donating compounds which will form ligand-type complexes with $BF_3$. (The $BF_3$ molecule has a strong tendency to accept electrons from donor molecules.) The $BF_3$ complexes are preferable to $BF_3$ gas because the complexes are usually liquids or solvent-soluble solids which can be more easily handled.

Representative of the class of electron donor compounds which can be employed to prepare the $BF_3$ addition complex are monohydric alcohols, phenols, water, mineral acids containing oxygen, ethers, ketones, aldehydes, esters and nitriles.

Some representative examples of $BF_3$ complexes are $BF_3 \cdot$diethyl ether, $BF_3 \cdot$diisopropyl ether, $BF_3 \cdot$acetophenone, $BF_3 \cdot$ benzophenone, $BF_3 \cdot$ benzaldehyde, $BF_3 \cdot$ tolualdehyde, $BF_3 \cdot$ m-nitrobenzaldehyde, $BF_3 \cdot$ ethyl benzoate, $BF_3 \cdot$ phenyl acetate, $BF_3 \cdot$ benzonitrile, $BF_3 \cdot$ acetonitrile, $BF_3 \cdot$ methanol, $BF_3 \cdot$ ethanol, $BF_3 \cdot$ butanol, $BF_3 \cdot 2$ phenol, $BF_3 \cdot$ p-cresol, $BF_3 \cdot -H_2O$, $BF_3 \cdot 2H_2O$, $BF_3 \cdot 100\%$ phosphoric acid, $BF_3 \cdot 85\%$ phosphoric acid, $BF_3 \cdot H_3PO_4$, $BF_3 \cdot$ acetic acid and $BF_3 \cdot 2$ acetic acid.

Tributyltinfluoride or any other trialkyltin fluoride may also be used as the fluorine containing component in this invention.

The three component catalyst system of this invention has shown polymerization activity over a wide range of catalyst concentrations and catalyst ratios. Apparently, the three catalyst components interact to form the active catalyst. As a result, the optimum concentration for any one catalyst component is dependent upon the concentration of each of the other catalyst components. Although polymerization will occur over a wide range of catalyst concentrations and ratios, polymers having the most desirable properties are obtained over a narrower range. It has been found that polymerization will occur when the mole ratio of the Group II and III metal derivative compound (Me) to the organonickel and/or organocobalt compound (Ni), ranges from about 0.3/1 to about 200/1, and when the mole ratio of the fluorine containing compound or metal fluoride or HF or $BF_3$ gas or the boron trifluoride complex, prepared by complexing boron trifluoride with the electron donating compounds (F) to the organonickel compound (Ni), ranges from about 0.33/1 to about 500/1, and where the mole ratio of the Group II or III metal derivative (Me) to the (F) ranges from about 0.1/1 to about 10/1.

The preferred Me/Ni mole ratio ranges from about 1/1 to about 60/1; the preferred F/Ni mole ratio ranges from about 1/1 to about 150/1; and the preferred Me/F mole ratio ranges from about 0.3/1 to about 3.0/1.

When organocobalt compounds replace organonickel compounds or mixtures of organonickel and organocobalt are used as the second catalyst component in the ternary system of this invention, the mole ratio of cobalt (Co) and/or nickel (Ni) to the other catalyst components are similar to those of nickel (Ni) shown above.

The three catalyst components may be charged to the polymerization system as separate catalyst components in either a stepwise or a simultaneous manner, sometimes called "in situ." The catalyst may also be "preformed" outside the polymerization system whereby all the catalyst components are mixed in the absence of the butadiene, either with or without an inert diluent and the complete blend then added to the polymerization system.

An improved preformed catalyst system can be prepared by having a small amount of a diolefin, for example, butadiene, present when the catalyst components, Me, Ni and F are mixed together. The diolefin apparently reacts with the catalyst components to form a catalyst complex which is more active, particularly when the polymerization system contains impurities, than either the in situ catalyst (which is prepared in the presence of a very large amount of monomer) or the simple preformed catalyst prepared in the absence of the diolefin. The improved preformed catalyst may be prepared by dissolving a small amount of diolefin in a hydrocarbon solvent such as benzene or hexane, and then adding the Me component, the Ni component and then the fluorine component to the solvent.

The particular order of addition may be varied somewhat but it is advantageous to have (1) the diolefin present before the addition of both Me and Ni components and (2) the Ni component present before the addition of both Me and fluorine components. The amount of the diolefin which can be present to form the improved preformed catalyst can be varied over a wide range, and, of course, is somewhat dependent on the other catalyst concentrations. However, the amount of diolefin, preferably butadiene, used to prepare the preformed catalyst should be between about 0.001 and 3% of the total amount of monomer to be polymerized. Based upon catalyst mole ratios, the diolefin to the Ni mole ratio should be between about 0.5/1 and 1000/1 and preferably between about 2/1 and 100/1.

The total amount of catalyst employed will depend, of course, on a number of factors, such as the purity of the polymerization system, the temperature employed and the rate desired. A sufficient amount of catalyst must be employed to bring about polymerization. To those skilled in the art, the amount of catalyst required will become readily apparent from the teachings of the examples found elsewhere in this specification.

The concentration of the total catalyst system employed depends on factors such as purity of the system, polymerization rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature, such as $-10°$ C. or below, up to high temperatures of $100°$ C. or higher. However, a more desirable temperature range is between about $30°$ C. and about $90°$ C. Ambient pressures are usually used but higher or lower pressures may be employed.

The practice of this invention is further illustrated by reference to the following examples which are intended to be representative rather than restrictive of the scope of this invention.

A purified butadiene in benzene solution containing 10 grams of butadiene per hundred milliliters of solution was charged to a number of 4-ounce bottles. Nitrogen was flushed over the surface of this premix while the catalyst was charged in the amounts shown in the table below. The catalyst employed was a mixture of poly(n-butyliminoalane), nickel octanoate (Ni salt or Ni Oct) and boron trifluoride·diethyl ether complex, and was charged by the in situ method. The sealed bottles were tumbled end-over-end for 18 hours in a water bath maintained at $50°$ C. The polymerizations were deactivated by the addition to the system of an amine-type stopping agent and an antioxidant, both components being added as one part by weight per hundred parts of original monomer charged.

The results are shown in Table I below. Dilute solution viscosity is shown as DSV. DSV is a measure of molecular weight of the polymer.

TABLE I

Preparation of High Cis-1,4-Poly Bd with an Alane-Ni-BF₃ Catalyst
Conditions: 50° C., 18 hours
Solvent: Benzene

| Catalyst concentration, millimoles/100 g. Bd | | | Yield, wt. percent | DSV | Percent | |
|---|---|---|---|---|---|---|
| Alane | Ni octanoate | BF₃·Et₂O | | | Gel | Cis-1,4-poly Bd |
| 0.8 | 0.05 | .75 | 95 | 1.72 | 0.5 | |
| 1.0 | .05 | .75 | 95 | 1.67 | 0 | 95.8 |
| 1.4 | .05 | 1.0 | 95 | 1.47 | 0 | |
| 2.5 | .05 | 1.5 | 96 | 1.16 | 0 | |

The above data indicate that the above catalyst system promotes an efficient and practical polymerization.

EXAMPLE II

Butadiene was polymerized in a manner similar to that used in Example I except that the catalyst component of the above derivative [poly(n-butyliminoalane)] was reduced below the level of 0.8 millimoles/100 grams of butadiene. Results are shown in Table II below.

TABLE II

Preparation of High Cis-1,4 Polybutadiene with an Alane-Ni-BF₃·Complex Catalyst
Conditions: 50° C., 19 hours
Solvent: Benzene

| Catalyst concentration, millimoles/100 g. Bd | | | Yield, wt. percent | DSV | Percent cis-1,4 |
|---|---|---|---|---|---|
| Alane | Ni octanoate | BF₃·Et₂O | | | |
| 0.60 | 0.05 | 0.075 | 72 | 2.48 | |

The above data suggest that the DSV of the polymer can be raised by reducing the catalyst level of the alane derivative component.

EXAMPLE III

Butadiene was polymerized in a manner similar to that used in Example I except that hexane replaced benzene as the polymerization system solvent. The results are shown in Table III below.

TABLE III

Preparation of High Cis-1,4 Polybutadiene with an Alane-Ni-BF₃·Complex Catalyst
Conditions: 50° C., 19 hours
Solvent: Benzene

| Catalyst concentration, millimoles/100 g. Bd | | | Yield, wt. percent | DSV | Percent cis-1,4 |
|---|---|---|---|---|---|
| Alane | Ni octanoate | BF₃·Et₂O | | | |
| 0.67 | 0.055 | 0.83 | 90 | 2.59 | 96.5 |
| .89 | 0.055 | 0.83 | 89 | 2.48 | |
| .67 | 0.055 | 1.11 | 92 | 2.35 | |
| .89 | 0.055 | 1.11 | 95 | 2.26 | |
| 1.11 | 0.055 | 1.11 | 93 | 2.13 | |
| 1.54 | 0.055 | 1.11 | 93 | 2.02 | |

The above data indicate that polymers with higher DSV's result from using hexane rather than benzene as a solvent—other factors being similar.

While certain representative embodiments and details have been shown for the purpose of illustrating the invention, it will be apparent to those skilled in this art that various changes and modifications may be made therein without departing from the spirit or scope of the invention.

What is claimed is:

1. The process of polymerization which comprises polymerizing at least one monomer selected from the group consisting of butadiene and butadiene in combination with other diolefins by contact, under solution polymerization conditions, with a catalyst comprising (1) at least one compound selected from the group consisting of (a) the amine derivatives of hydrides of metals selected from the amine derivatives of the hydrides of metals of Groups II and III and (b) the amine complex compounds of the hydrides of Groups II and III, (2) at least one compound selected from the class consisting of nickel salts of carboxylic acids, organic complex compounds of nickel, and nickel tetracarbonyl, and (3) at least one fluorine containing compound selected from the group consisting of hydrogen fluoride, metal fluorides, trialkyltin fluorides, boron trifluoride and boron trifluoride addition complexes with at least one material selected from the group consisting of monohydric alcohols, phenols, water, mineral acids containing oxygen, ethers, ketones, aldehydes, esters and nitriles, wherein the mole ratio of component (1) to component (2) ranges from about 0.3/1 to about 200/1, the mole ratio of component (3) to component (2) ranges from about 0.33/1 to about 500/1 and the mole ratio of component (1) to component (3) ranges from about 0.1/1 to about 10/1.

2. The process according to claim 1 in which the compound of (1) is selected from the amine derivatives of the hydrides of metals of Groups II and III.

3. The process according to claim 1 in which the compound of (1) is selected from the amine complex compounds of the hydrides of Groups II and III.

4. The process of polymerization which comprises polymerizing butadiene by contact, under solution polymerization conditions, with a catalyst comprising (1) poly (n-butyliminoalane), (2) nickel octanoate and (3) a boron trifluoride addition complex in which the mole ratio of poly(n-butyliminoalane) to the nickel octanoate ranges from about 0.3/1 to about 200/1 and the mole ratio of the boron trifluoride addition complex to the organonickel compound ranges from about 0.33/1 to about 500/1 and where the mole ratio of the poly(n-butyliminoalane) to the boron trifluoride addition complex ranges from about 0.1/1 to about 10/1.

References Cited
UNITED STATES PATENTS

| 2,922,782 | 1/1960 | Hay | 260—94.9 |
|---|---|---|---|
| 3,245,976 | 4/1966 | Marconi et al. | 260—94.3 |
| 3,438,958 | 4/1969 | Throckmorton | 260—94.3 |
| 3,464,965 | 9/1969 | Yasunaga et al. | 260—94.3 |
| 3,468,867 | 9/1969 | Marconi et al. | 260—94.3 |
| 3,471,462 | 10/1969 | Matsumoto et al. | 260—94.3 |
| 3,404,137 | 10/1968 | Calfee | 260—91.1 |
| 3,476,734 | 11/1969 | Marconi et al. | 260—94.3 |
| 3,170,905 | 2/1965 | Ueda et al. | 260—94.3 |
| 3,432,517 | 3/1969 | Ueda et al. | 260—94.3 |
| 3,468,867 | 2/1969 | Marconi et al. | 260—94.3 |
| 3,513,149 | 5/1970 | Smith et al. | 260—94.3 |

JOSEPH L. SCHOFER, Primary Examiner

W. F. HAMROCK, Assistant Examiner

U.S. Cl. X.R.

260—82 1; 252—433